United States Patent [19]

Milo

[11] 4,094,346

[45] June 13, 1978

[54] TANK MANIFOLD

[75] Inventor: Joseph V. Milo, Elizabeth, N.J.

[73] Assignee: Universal Valve Co., Inc., Elizabeth, N.J.

[21] Appl. No.: 713,641

[22] Filed: Aug. 12, 1976

[51] Int. Cl.[2] .......... B65B 3/18; F16K 1/14

[52] U.S. Cl. .......... 141/286; 137/202; 141/301; 220/85 VR

[58] Field of Search .......... 137/587, 588; 141/44, 141/45, 59, 285, 286, 290, 301-303, 307-310, 392; 220/85 VR, 85 VS; 127/197, 199, 201, 202

[56] References Cited

U.S. PATENT DOCUMENTS

| | | | |
|---|---|---|---|
| 1,778,092 | 10/1930 | Tallman | 137/587 X |
| 2,775,988 | 1/1957 | Hamner | 141/303 X |
| 3,770,028 | 11/1977 | Madden | 141/59 |
| 3,996,976 | 12/1976 | Hansel | 141/285 |

*Primary Examiner*—Richard E. Aegerter

*Assistant Examiner*—Frederick R. Schmidt

*Attorney, Agent, or Firm*—Weiser, Stapler & Spivak

[57] ABSTRACT

A tank manifold for flammable liquid storage tanks comprising in a unitary fitting a liquid fill section, a vapor return section and a tank vent section. A float vent valve is mounted in the vapor return section in a manner to permit extraction and replacement of the float vent valve from a remote location without disturbing the piping connections to the manifold. The tank manifold connects to the tank fill opening and includes in a single fitting a tank fill opening, a vapor return opening and a tank vent opening.

2 Claims, 5 Drawing Figures

FIG. 3
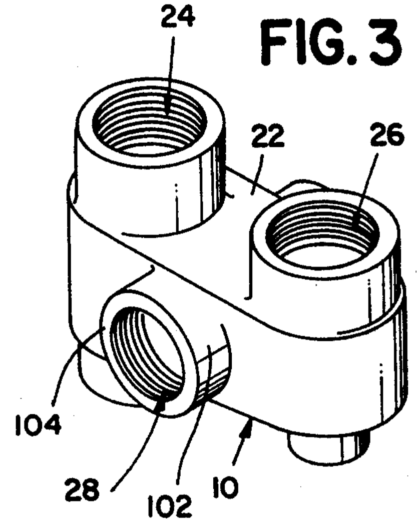
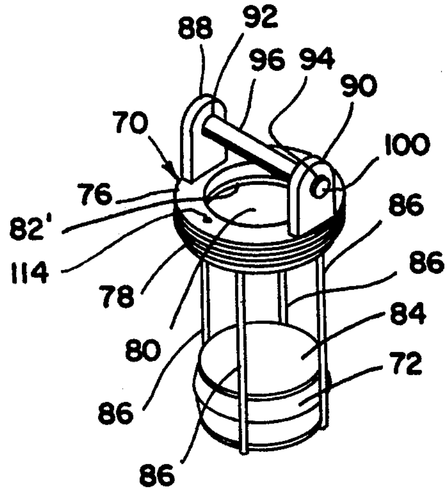
FIG. 5
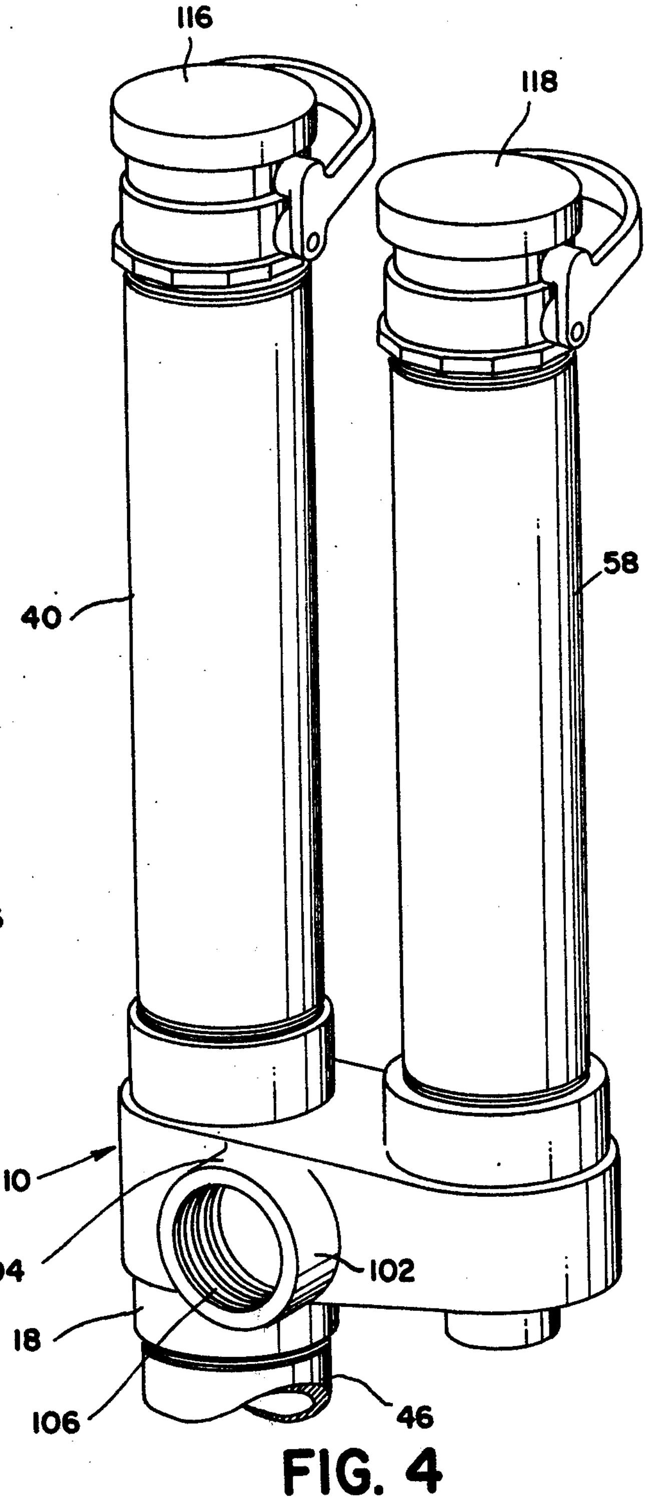
FIG. 4

TANK MANIFOLD

BACKGROUND OF THE INVENTION

The present invention relates generally to flammable liquid storage tanks, and more particularly, is directed to a manifold fitting suitable for use with tank vapor control systems.

It is common practice to store flammable liquids, such as various petroleum products, in storage tanks which may be located either above ground or below ground. In view of the fire hazard attendant with the storage of such flammable liquids, code officials, insurance underwriters and fire prevention officials have engaged in studies to establish suitable regulations to provide for adequate storage of such materials. As a result of this effort and study, both in this country and abroad, suitable safety standards have been promulgated which provide for storage of flammable liquids, such as gasoline, in underground storage tanks of suitable size and strength for the purpose. The safety regulations provide for such variables as depth of storage, spacing between tanks and flammable vapor venting systems.

It has long been required that all or substantially all flammable liquid storage tanks, either of the above ground type or underground type, be provided with suitable venting devices to equalize pressures within the tank. Most commonly, venting devices have consisted essentially of a vent pipe connected directly to the vapor space within the tank in a manner to lead flammable and other vapors upwardly to atmosphere at some distance above grade level. It has been found that the usual venting systems, as above described, have generally provided adequate safety for the flammable product stored within the above ground or underground storage tanks. Accidents directly attributable to the tank venting systems, when adequately functioning, are extremely rare.

More recently, considerations other than strict vent safety have arisen and now, concerned citizens have become cognizant of the ecological problems arising from flammable liquid storage in relatively crowded areas. It has been found that considerable pollutants can be introduced to the atmosphere through the vent pipe of flammable liquid storage tank unless adequate provisions are made to control the release of such flammable vapors. In accordance with more recent studies made of the venting systems of flammable liquid storage tanks, concern has been directed to the effect of the flammable vapors which have been heretofore freely discharged into the atmosphere through the tank vents. These studies have also concentrated on the environmental changes and effects caused by the release of such vapors and accordingly, the more recent studies have encompassed areas much wider in scope than merely the safety factor consideration of such flammable liquid storage.

As a result of the environmental considerations, the venting systems of flammable liquid storage tanks are now being rapidly changed from the previous simple open vent to atmosphere as heretofore deemed necessary and desirable for purely safety considerations, to some type of normally closed, but openable when necessary, type of storage tank vent system, from the standpoint of air pollution control.

It has been found that most pollutants escape through the vent system during the tank fill operation. Accordingly, systems have been devised wherein the vapors that heretofore were forced upwardly to atmosphere through the tank vent during the tank fill operation are now returned directly to the tank truck through a vapor return system.

Prior workers in the art have encountered difficulties in installation and servicing of such vapor return systems, particularly when converting existing underground tank vent systems to the controlled vapor release or vapor return system. Considerable excavation has been required to expose both the tank fill pipe and the tank vent pipe of each underground storage tank to equip such tanks with a vapor return system. In the case of servicing underground storage tanks that have proved defective for one reason or another, a considerable excavation and servicing has always been required to take corrective action.

SUMMARY OF THE INVENTION

The present invention relates generally to the field of vapor recovery systems for flammable liquid storage tanks, and more particularly, is directed to a one piece fill and vapor return manifold suitable to permit vapor recovery during tank filling procedures.

The present invention comprises a unitary manifold which is adapted to be threadedly engaged into the usual flammable liquid storage tank fill opening. The fitting comprises a fill section and a communicating vapor recovery section. The vapor recovery section includes a float vent valve suitable to restrict the flow of product into the vapor recovery line. The manifold also comprises a vent section suitable for connection of conventional tank vent lines.

The float vent valve threadedly engages the manifold within the vapor return section in a manner to facilitate removal of the float vent valve from a remote location above the manifold. In this manner, the float vent valve is designed as an extractable valve to permit servicing or replacement without the need for excavating down to the manifold.

The manifold fill section includes interior construction which serves as a retainer and guide for a tank fill of the drop tube type. The drop tube is retained within the tank fill section of the manifold in generally concentric relationship. The drop tube and the body of the manifold fill section define an annular vapor space which communicates both with the interior of the flammable liquid storage tank itself and with the interior of the manifold at the vapor recovery section and the tank vent section. Thus, by connecting a vapor recovery hose to an extension of the vapor recovery section, vapor can be drawn directly from within the underground storage tank during the tank filling operation to thereby prevent the loss of hydrocarbon loaded vapor directly to atmosphere. Normal venting of the flammable liquid storage tank can be readily provided by connecting a usual tank vent line to the manifold at the tank vent section.

The present arrangement is inexpensive in manufacture and relatively simple in installation. The float vent valve and the fill drop tube are serviceable from above without the need to excavate or otherwise expose the manifold once installtion has been completed. The apparatus thereby results in decreased costs and enables owners of existing and new service stations to easily install completely satisfactory vapor recovery systems at minimum cost.

It is therefore an object of the present invention to provide an improved vapor recovery system of the type set forth.

It is a further object of the present invention to provide novel tank manifold suitable to provide vapor recovery with existing underground flammable liquid storage tanks.

It is another object of the present invention to provide a novel tank manifold useful for vapor recovery which may be universally applied to existing and new flammable liquid storage tank installations.

It is another object of the present invention to provide a novel tank manifold capable of combining at one location the functions of tank filling, tank venting and vapor recovery.

It is another object of the present invention to provide a novel manifold for an underground flammable liquid storage tank comprising means to fill the tank, means to recover vapor during the filling operation and means to vent the tank, the means to recover including extractable float vent valve means.

It is a further object of the present invention to provide a novel manifold fitting suitable for use with underground flammable liquid storage tanks which include means to receive and retain a tank fill drop tube, vapor recovery means and float vent valve means positioned within the vapor recovery means, and means to service the fill drop tube and the float vent valve from positions remote from the flamable liquid storage tanks.

It is another object of the present invention to provide a novel tank manifold that is inexpensive in manufacture, relatively easy in installation and trouble free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 3 is an isometric view of the tank manifold of FIG. 2 at reduced scale.

FIG. 4 is an isometric view of the tank manifold with usual piping connections.

FIG. 5 is an enlarged, isometric view of a modified float vent valve construction.

PREFERRED EMBODIMENT OF THE INVENTION

Figure 1:
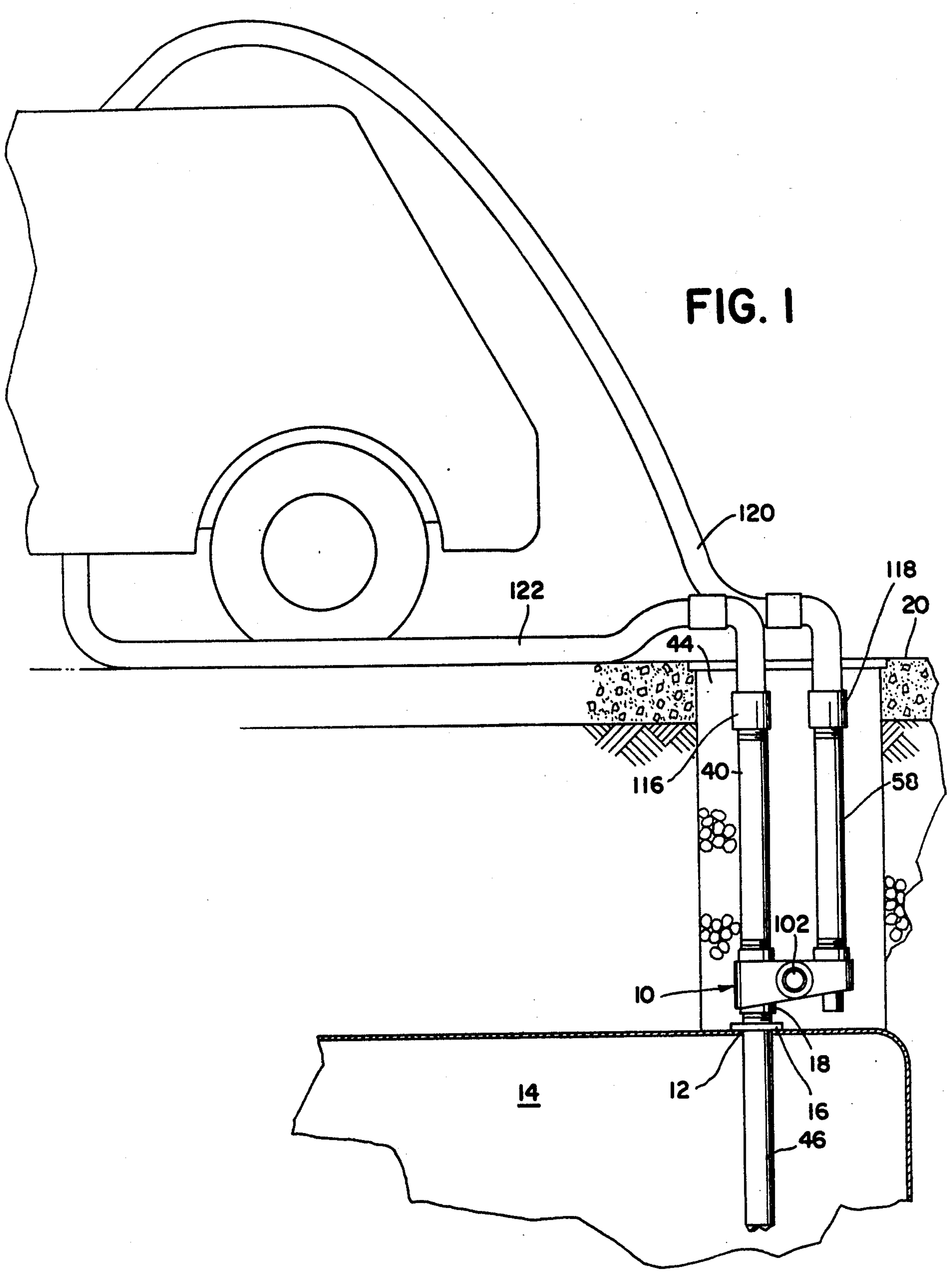
FIG. 1 is a side elevational view, partly in section showing the tank manifold in use.

Although specific terms are used in the following description for the sake of clarity, these terms are intended to refer only to the particular structure of the invention selected for illustration in the drawings, and are not intended to define or limit the scope of the invention.

Referring now to the drawings, there is shown in FIG. 1 a tank manifold 10 which is constructed and installed in accordance with the present invention. The tank manifold fitting 10 securely mounts upon the underground flammable liquid storage tank 14 at the usual fill opening 12 in conventional manner such as by employing a bushing 16 and pipe nipple 18 of desired length. The height of the manifold fitting 10 above the top of the tank 14 is not dependent upon the proper operation of the device and so the length of the nipple 18 forms no part of the present invention. It will also be appreciated that, if desired, the entire tank manifold 10 could be elevated above the ground surface 20 if so desired without interfering with the use or function of the device.

Figure 2:
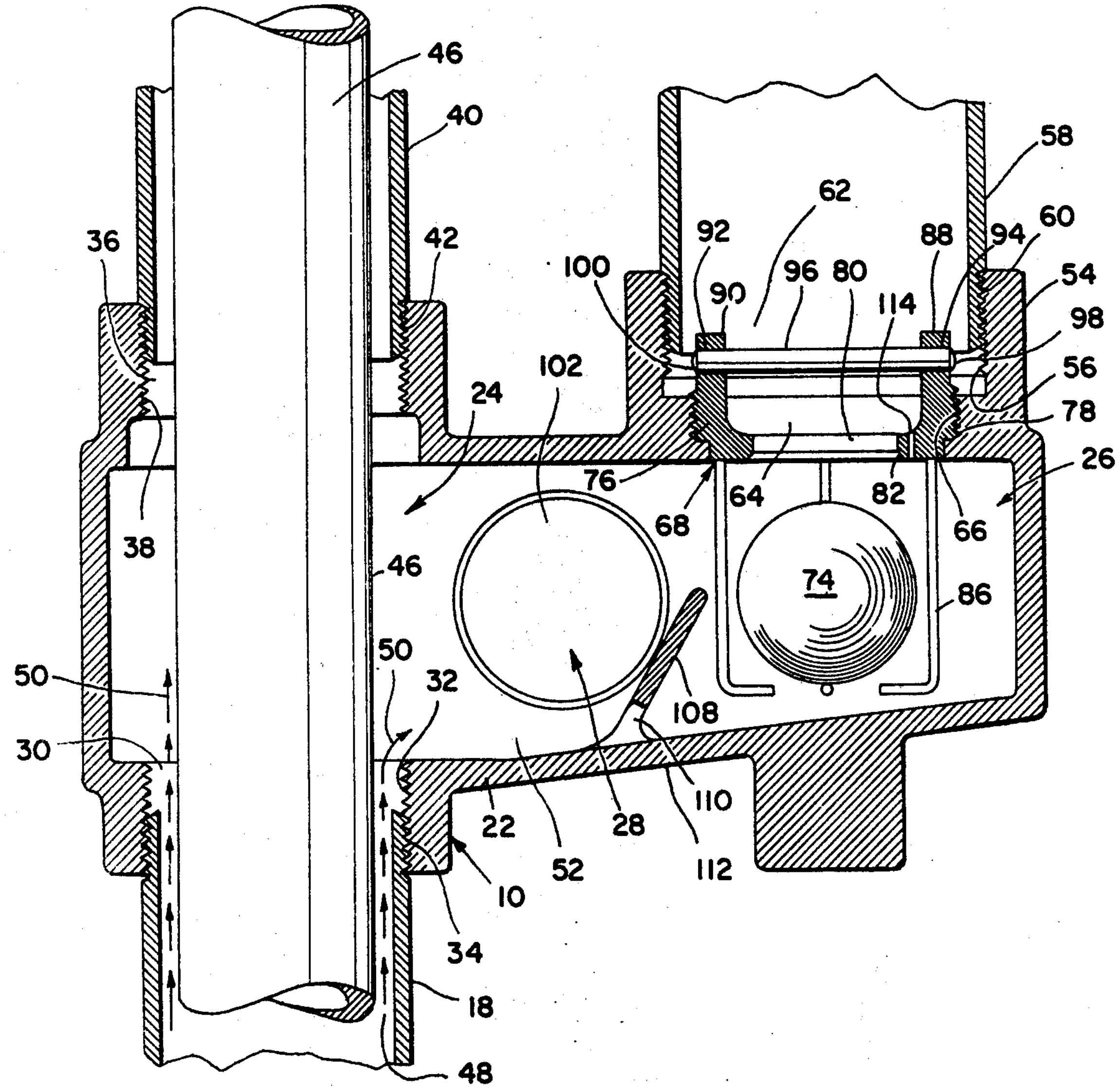
FIG. 2 is an enlarged, cross-sectional view of the tank manifold.

Referring now to FIGS. 2 and 3, the tank manifold fitting 10 is illustrated comprising generally a unitary body 22 in which is formed a plurality of openings, the use of which will now be set forth. The tank manifold fitting 10 comprises generally a tank fill section 24, a vapor recovery section 26 and an intermediate vapor space 28 through which the fill section and vapor recovery section are in communication. The manifold body 22 is generally hollow to provide a ready path of travel for the vapors (not illustrated) as they travel from within the tank 14 through the tank fill section 24 to either the vapor recovery section 26 or the vapor section 28.

The tank fill section 24 comprises a lower opening 30 which includes an interiorly threaded section 32. The manifold fitting 10 is conveniently secured to the flammable liquid tank 14 in conventional manner, such as by employing a bushing 16 and pipe nipple 18. The external thread 34 of the nipple 18 engages the internal thread 32 of the tank fill section to provide a secure inter-connection. The upper area of the tank fill section 24 is provided with an upper opening 36 which is in registry over the bottom opening 30 to receive the fill drop tube 46 therethrough as hereinafter more fully set forth. The upper opening 36 is provided with an internally threaded section 38 to receive the fill pipe 40 thereon in a tight, threaded engagement. The exterior threaded section 42 of the fill pipe 40 threadedly engages the interior threaded section 38 of the fitting in a conventional, secure manner. In accordance with usual practice, the fill pipe 40 extends upwardly and terminates below ground level 20 within a conventional manhole 44 (FIG. 1).

A tank fill drop tube 46 extends from the manhole 44 in conventional manner and projects downwardly through the vertically aligned tank fill section 24 openings 36, 30. Preferably, the drop tube 46 should be of sufficient length to extend from the manhole 44 to a location approximately 4 to 6 inches above the bottom of the tank 14. It is important that the diameter of the drop tube 46 is less than the diameter of the lower opening 30. For example, if the diameter of the opening 30 is 4 inches, the diameter of the drop tube should be no greater than $3\frac{1}{2}$ inches to thereby define an annular space 48 between the drop tube 46 and the threaded sections 32 at the bottom opening 30. It is through this annular space 48 that the vapors escape from within the interior of the tank 14 through the space 48 and into the hollow interior 52 of the manifold fitting 10 as illustrated by the arrows 50.

The vapor recovery section 26 comprises generally an upwardly extending boss 54 which is machined or otherwise provided with an interiorly threaded section 56. The interiorly threaded section 56 defines a top opening 62 which is in communication with the interior 52 of the manifold fitting 10. A vapor recovery pipe 58 having exterior threads 60 threadedly engages the interiorly threaded section 56 to form a secure, substantially vapor-tight interconnection. The vapor recovery pipe 58 extends from the boss 54 up to the manhole 44 as illustrated in FIG. 1.

As best seen in FIG. 2, the vapor recovery section 26 is machined to define a second opening 64 which is concentric with and smaller than the opening 62 through the boss 54. The second opening 64 is provided with an interiorly threaded section 66 to receive the extractable float vent valve in the manner hereinafter more fully set forth. The diameter of the second interiorly threaded section 66 should be small enough to define the second opening 64 having a diameter less than the interior diameter of the vapor recovery pipe 58 so that the float vent valve 68 may be extracted through the vapor recovery pipe 58 in the manner hereinafter more fully set forth.

A float vent valve 68 of the ball type as illustrated in FIG. 2 or a float vent valve 70 of the disc type as illustrated in FIG. 5 is employed in conjunction with the vapor recovery section 26 in the manner illustrated. The float vent valve 68 or 70 may be similar to the float vent valve illustrated in U.S. patent application, Ser. No. 549,441, now U.S. Pat. No. Des. 242,618, which application has been assigned to the assignee of the present application. The float valve 70 is similar in construction and in function to the float vent valve 68, the major difference being that the float vent valve 70 employs a steel and cork disc 72 for sealing purposes whereas the float vent valve 68 employs a stainless steel or cork ball 74 for sealing purposes.

Each of the float vent valves 68 or 70 comprises a generally cylindrical body 76 which includes an exteriorly threaded section 78. It will be noted that the exteriorly threaded section 78 of the valve body 76 engages the interiorly threaded section 66 of the second opening 64 in a secure manner. The valve body defines a vapor opening 80 through which vapors from within the tank 14 upwardly pass into and through the vapor recovery pipe 58. The vapor opening 80 is downwardly formed to provide a seat 82 upon which the stainless steel or cork ball 74 can seat in the event of over-filling of the tank to prevent the escape of product upwardly therethrough. In the case of the disc type float vent valve 70 of FIG. 5, the seat 82' is substantially flat to receive thereagainst the top disc 84 of the steel and cork disc assembly 72.

A cage 86, which may be a plurality of bent wire arms, depends from the valve body 76 to maintain the ball 74 (or disc 72) within the vapor recovery section 26 in alignment with the seat 82 (82') for sealing purposes should the tank 14 be overfilled and product be allowed to rise within the interior space 52 defined within the manifold fitting body 22. The seating of the ball 74 or disc 72 against the respective seats 82, 82' will alert the operator (not shown) during the tank filling operation that the tank 14 had been filled to capacity by preventing the entrance of additional product through the drop tube 46.

The float vent valve body 76 extends upwardly in a pair of diametrically opposed lugs 88, 90. As illustrated in FIG. 2, it is noteworthy that the greatest distance between the lugs 88, 90 is less than the diameter of the interiorly threaded section 56 so as not to interfere with the vertical movement of the float vent valve 68 or 70 within the interior of the vapor recovery pipe 58. The lugs 88, 90 are drilled or otherwise provided with horizontally aligned openings 92, 94 through which is received a pin 96 in permanent engagement. The ends 98, 100 of the pin 96 may be enlarged after installation in well-known manner to prevent disengagement of the pin 96 from the openings 92, 94.

By employing the float vent valve body construction as above set forth with the interiorly threaded section 56 forming the area of largest diameter, it is possible by using a special wrench having an extended handle (not shown) to either install or remove the float vent valve 68 from above without the need for excavating below the ground level 20 down to the manifold fitting 10 for this purpose. It is contemplated that a special wrench having a handle of approximately 4 to 5 feet in length and slender enough to fit within the interior of the vapor recovery pipe 58 would be suitable for this purpose.

The vapor section 28 of the manifold fitting 10 is illustrated as positioned intermediate the tank fill section 24 and the vapor recovery section 26 to provide for vapor passage between the tank fill section and the vapor recovery section. The body wall defining the vapor section 28 may be provided with one or more side openings 102 for further vapor control purposes. As seen in FIGS. 3 and 4, the vapor openings 102 preferably are cast in the form of extended bosses 104 which may be internally threaded at 106 in conventional manner. The vapor section openings 102 could be employed for a variety of purposes, such as normal tank venting, for manifolding of vents of adjacent tanks or for island vapor return systems should island vapor return construction be a requirement of any local authority.

As illustrated in FIG. 2, a baffle 108 is provided in the vapor section 28 immediately upstream of the float vent valve ball 68. As illustrated, the baffle 108 is integrally formed interiorly of the body 22 and is inclined towards the ball 74 at an angle of approximately 30 degrees from the vertical. The baffle serves to direct the flow of vapor above the ball 74 to prevent direct impingement of the vapor as it travels the path illustrated by the arrows 50 from the vapor space of the tank 14 through the vapor opening 80 defined in the float vent valve 68. The base of the baffle 108 is provided with an opening 110 to permit drainage of any product that may be introduced into the vapor recovery section 26 to the tank fill section 24. It is noteworthy that the floor 112 of the body 22 slopes through the vapor section 28 downwardly from the vapor recovery section 26 towards the tank fill section 24. If desired, the valve body 76 can be provided with a weep hole 114 outwardly from the seat 82 to prevent vapor lock and to permit a limited amount of product drainage even when the ball 74 is positioned against the seat 82.

In order to use the manifold 10 in the case of an existing installation, the piping contractor must first excavate as necessary to expose any convenient tank outlet. The bottom threaded section 32 is then engaged upon the tank outlet (not illustrated) in conventional manner, such as by employing a nipple 18 of suitable length. A section of fill pipe 40 is then added to the manifold 10 at the threaded section 38 to bring the fill pipe up to manhole level. A conventional aluminum drop tube 46 is inserted in the fill pipe 40 to desired tank depth and is held in position in the manhole 44 by employing a suitable adaptor.

The vapor recovery pipe 58 is threadedly engaged upon the threaded section 56 of the vapor recovery section 26 at the first opening 62 and is extended to grade within the manhole 44. Within the second opening 64 of the vapor recovery section 26 is installed float means such as a ball float valve 68 or disc float valve 70 by threadedly engaging the float valve upon the interiorly threaded section 66. It is noteworthy that the float vent valve 68 or 70 comprises extractable means and is extractable through the vapor recovery pipe 58 by employing a special wrench having an elongated handle.

The wrench (not shown) is lowered down the vapor recovery pipe at the manhole 44 and has its jaws engaged upon the pin or bar 96. Then by turning the wrench handle from a position above ground 20 remote from the float vent valve, the float vent valve 68 can be disengaged from the manifold 10 and extracted through the riser 58 for servicing or replacement. The special wrench is provided with a jaw member capable of engaging the pin 96 for extraction purposes after disengagement.

The top of the vapor recovery pipe 58 is equipped within the manhole 44 with a suitable dry break fitting for function with the tank truck vapor recovery apparatus 120. As the tank 14 is filled from the tank truck fill hose 122, vapor from within the tank is drawn up into the manifold 10 vapor section 28 about the drop tube 46 in the manner indicated by the arrows 50. If there is a tank overfill, liquid will rise into the manifold and flow into the float chamber. Such a condition will cause the ball or disc to float upwardly within the cage 86 and seal against the seat 82 to seal off the vapor recovery pipe 58. This condition will be noted in the flow window of the fill nozzle and the operator will then shut down the fill operation. The manifold 10 thus functions to prevent liquid from entering the vapor return hose 120 in the event of overfill.

Although the present invention has been described with reference to the particular embodiment herein set forth, it is understood that the present disclosure has been made only by way of example and that numerous changes in the details of construction may be restored to without departing from the spirit and scope of the invention. Thus, the cope of the invention should not be limited by the foregoing specification, but rather only by the scope of the claims appended hereto.

What is claimed is:

1. In a vapor recovery system for a liquid and vapor containing tank, the combination of a manifold adapted to be mounted upon the tank, said manifold comprising a fill section and a vapor recovery section, said fill section having a fill opening in communication with the tank, said vapor recovery section having a boss defining a first vapor return opening for recovering vapor from the tank, said vapor recovery section having a smaller bottom opening in registry below the first vapor return opening, said first and second openings being in communication and defining a vapor channel through which the vapor to be recovered passes;

means to admit vapor from the tank into the manifold through the fill opening;

float means mounted in the vapor recovery section at the said second opening to prevent liquid from exiting the manifold through the vapor return opening, the said float means being of size and configuration to upwardly pass through the first opening to permit remote removal from above;

an inclined baffle affixed interiorly at the manifold intermediate the float means and the fill section; and wherein the manifold comprises a floor which slopes downwardly from the vapor recovery section towards the fill section, the baffle being secured to the floor and being provided with a drain opening, said opening permitting the passage of liquid along the floor from the vapor recovery section to the fill section and thence back to the tank.

2. The vapor recovery system of claim 1 wherein the baffle extends upwardly from the floor a distance less than height of the float member above the floor.

* * * * *